United States Patent
Jones

(10) Patent No.: US 8,448,348 B1
(45) Date of Patent: May 28, 2013

(54) CONSTRUCTION METHOD AND APPARATUS

(76) Inventor: Boyd Jones, Lincoln, NE (US)

(*) Notice: Subject to any disclaimer, the term of this patent is extended or adjusted under 35 U.S.C. 154(b) by 0 days.

(21) Appl. No.: 13/425,366

(22) Filed: Mar. 20, 2012

(51) Int. Cl.
- *G01B 3/10* (2006.01)
- *B25H 7/00* (2006.01)
- *E04G 21/18* (2006.01)
- *E04B 1/10* (2006.01)

(52) U.S. Cl.
USPC ............ 33/760; 33/613; 33/679.1; 52/745.21

(58) Field of Classification Search
USPC ................. 33/760, 613, 679.1; 52/745.21
See application file for complete search history.

(56) References Cited

U.S. PATENT DOCUMENTS

| | | |
|---|---|---|
| 2,187,087 A | 1/1940 | Leary |
| 3,210,850 A | 10/1965 | Grzyb |
| 3,270,421 A | 9/1966 | Jones |
| 4,149,320 A | 4/1979 | Troyer et al. |
| 4,367,590 A | 1/1983 | Winter |
| 4,499,666 A * | 2/1985 | Smith ............................. 33/562 |
| 4,670,990 A | 6/1987 | Horvath |
| 4,708,755 A | 11/1987 | Lambelet |
| 4,927,696 A | 5/1990 | Berg |
| 5,012,590 A | 5/1991 | Wagner et al. |
| 5,107,601 A | 4/1992 | Semchuck |
| 5,113,596 A * | 5/1992 | Meyers ........................... 33/770 |
| 5,129,153 A * | 7/1992 | Burns, Sr. ...................... 33/613 |
| 5,367,783 A * | 11/1994 | Nygren ........................... 33/613 |
| 5,627,763 A * | 5/1997 | Carlson .............................. 703/1 |
| 5,641,377 A | 6/1997 | Chung et al. |
| 5,666,737 A | 9/1997 | Ryan |
| 5,687,539 A * | 11/1997 | Bond ........................... 52/748.1 |
| 5,884,411 A * | 3/1999 | Raber .............................. 33/613 |
| 5,913,586 A | 6/1999 | Marshall |
| 5,924,213 A | 7/1999 | Lee |
| 5,937,531 A * | 8/1999 | Menk et al. ..................... 33/613 |
| 6,494,014 B2 | 12/2002 | Lafrance |
| 6,530,180 B2 * | 3/2003 | Edmondson et al. ........... 52/105 |
| 6,817,110 B2 | 11/2004 | Bohnengel |
| 6,895,684 B1 * | 5/2005 | Firth ............................... 33/613 |
| 7,028,446 B2 | 4/2006 | Winchester |
| 7,059,061 B2 | 6/2006 | French |
| 7,219,440 B2 * | 5/2007 | Lewis et al. .................... 33/760 |
| 7,222,435 B1 | 5/2007 | Orfield et al. |
| 7,555,843 B2 | 7/2009 | Leonard |
| 7,644,510 B2 | 1/2010 | Gingerella et al. |
| 8,256,125 B2 * | 9/2012 | Jarzynka, Jr. ................... 33/427 |
| 2008/0201975 A1 * | 8/2008 | Gingerella et al. ............. 33/758 |

* cited by examiner

*Primary Examiner* — Christopher Fulton
(74) *Attorney, Agent, or Firm* — Matt Catlett

(57) ABSTRACT

The invention comprises novel apparatuses and methods for positioning and/or for determining the locations of one structural member such as a stud, rafter or joist on another structural member such as a beam during construction.

1 Claim, 11 Drawing Sheets

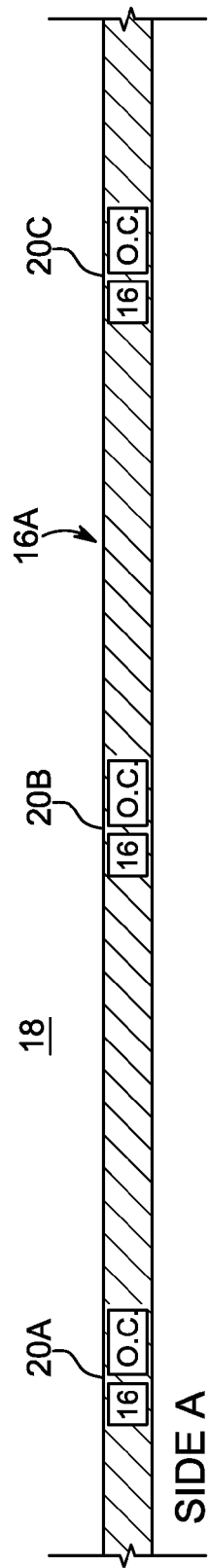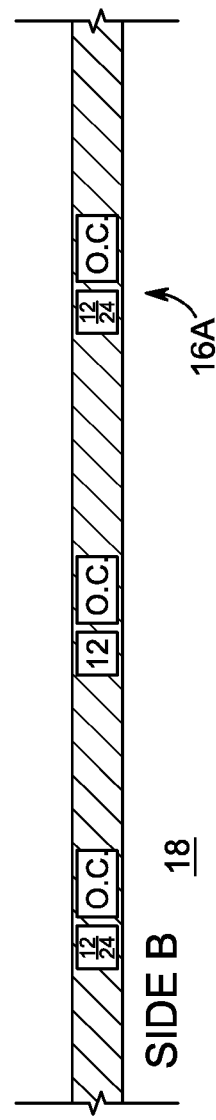

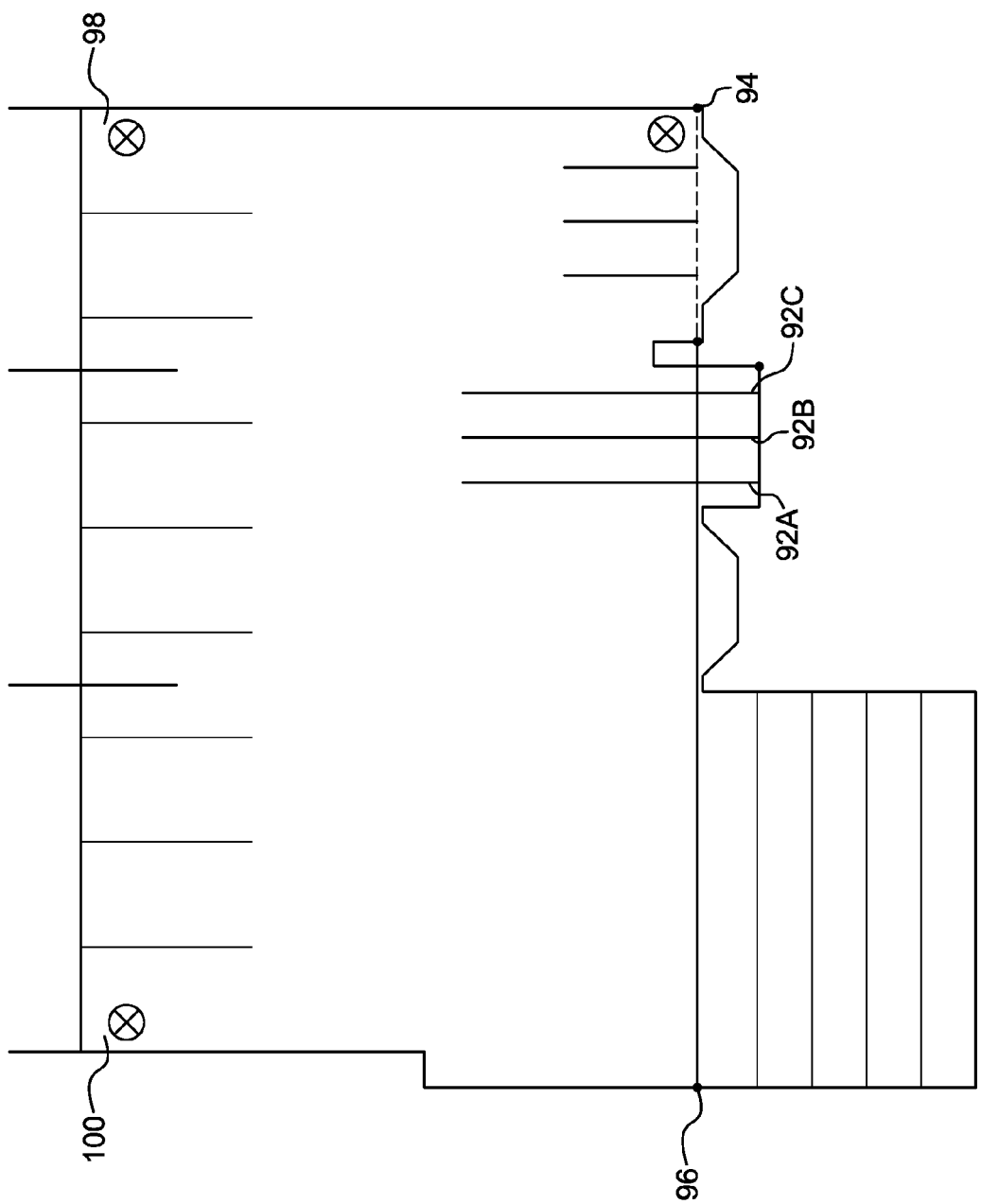

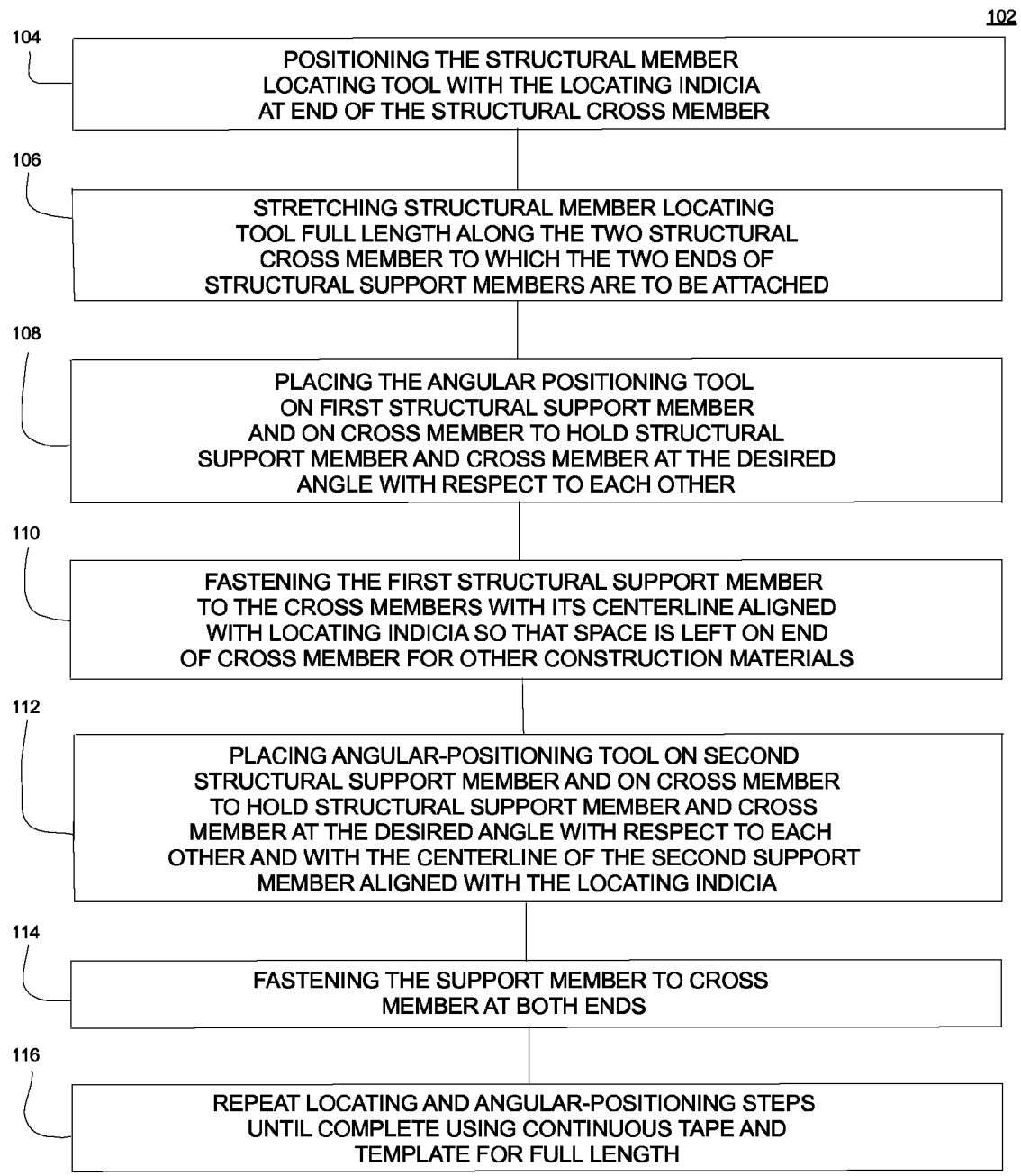

CONSTRUCTION METHOD AND APPARATUS

FIELD OF THE INVENTION

The field of the invention is building construction-related apparatuses and methods.

BACKGROUND OF THE INVENTION

This invention relates to apparatuses for simplifying the framing of buildings and to methods for making and using the apparatuses.

It is known to use pre-marked tapes or templates for locating each of a series of structural members used in construction such as studs, rafters or joists on a connecting structural member such as a top plate or bottom plate in the case of studs being nailed to a top or bottom plate to form a panel. One type of prior art pre-marked tape or template has a definite starting point, a definite end point and a predetermined length of 192 inches. It is used to measure that single distance. One side of this type of prior art pre-marked tape or template is self-adhesive and is stuck on the connecting structural member such as a top plate or bottom plate to which the series of structural members is being fastened. The tapes or templates include markings indicating the center location for each of the series of structural members. An example of this type of tape is disclosed in U.S. Pat. No. 6,494,014.

The prior art pre-marked tapes or templates have several disadvantages, such as for example: (1) under some circumstances they come loose before the structural members such as studs, rafters or joists have been properly fastened in place; (2) they are unable to locate structural members such as studs, rafters or joists over a distance longer than 192 inches without using multiple end to end tapes or templates or reusing the same tape or template by placing its starting point at the last marking and extending it a second time; (3) they are not as convenient nor as desirable to use to locate the studs or rafters or joists; and (4) some tapes or templates have so many markings on them that they are confusing in actual use.

It is known to dispense strapping tape in continuous lengths on spools and in boxes that can be used as dispensers. Some prior art tapes are adhesive and some dispensers of strapping tape have cutting blades attached to them for ease in cutting the tape. It is also known to mount steel strapping tape in rolls on dollies for convenience.

However, the prior art does not suggest the manner of using or usefulness of such applicators in the positioning or in determining the location of structural members during construction of buildings.

It is known to angularly position structural members with respect to each other by drawing a line on one of the structural members using a squaring tool and then aligning the edge of the other structural member along the line. This method has the disadvantage of being time-consuming.

SUMMARY OF THE INVENTION

Accordingly, it is an object of the invention to provide a novel apparatus and method for positioning and/or for determining the locations of one structural member such as a stud, rafter or joist on another structural member such as a beam during construction.

It is a further object of the invention to provide a novel method of making a tool for locating the positions of structural members.

It is a still further object of the invention to provide a novel apparatus and method for angularly positioning a first structural member with a second structural member to which it is to be fastened.

It is a still further object of the invention to provide a novel method and apparatus for reducing cumulative errors in positioning structural members.

It is a still further object of the invention to provide a novel construction technique and novel tools useful in using the novel technique.

It is a still further object of the invention to provide a novel method and novel apparatuses for rapidly fastening structural members in place in construction projects.

In accordance with the above and further objects of the invention, there are provided a novel angular-positioning tool and a novel structural member-locating tool, which in the preferred embodiment, is a locating tape or template. The angular positioning tool and the structural member-locating tool can be used together or separately in construction to fasten structural members together at the proper angles and at the proper locations with respect to each other. The tape or template has markings on each side indicating the proper location for fastening structural members such as studs to other structural members such as the top and bottom plate of framework panels. While the markings may be different distances apart, in the preferred embodiment, one side of the tape or template has markings spaced 16 inches from each other and the other side has markings spaced 12 and/or 24 inches from each other. The novel angular-positioning tool has at least a first positioning surface for positioning a first structural member and a second positioning surface for positioning a second structural member at a predetermined angle to the first structural member.

In one embodiment, the angular-positioning tool has two orientating portions that may be or are fixed in angular position with respect to each other. A first of the two orientating portions positions a stud, rafter or joist and the second of the two orientating portions positions the structural member to which the stud, rafter or joist is to be fastened. This requires at least one orientating surface on each of the first and second orientating portions against which the structural members can be positioned.

In one embodiment, the first orientating portion holds a stud, rafter or joist within a "U"-shaped member having either a flat side for orientating the stud, rafter or joist or flat orientating flanges extending from the flat side fitting against the sides of the stud, rafter or joist or both. In this embodiment, the second orientating portion is also a "U"-shaped member having either a flat side fitting against the sides of the cross member or orientating flanges extending from a flat side fitting against the sides of the cross member or both.

In the preferred embodiment, a locating opening is provided in the angular positioning tool for viewing marks on the tape or template and for fasteners for fastening structural members together such as by nailing the structural members together. The flanges are positioned parallel to each other and orthogonal to a connecting member of the "U"-shaped member to provide guide surfaces for angularly positioning the structural members such as studs, rafters or joists with their matching members. The open end of each of the "U"-shaped members is opposite to the locating opening so that the construction worker can insert the angular-positioning tool from the same side as the locating tape or template.

Advantageously, the angular-positioning tool: (1) has wide enough members to extend between the surface of a construction workers hand and the structural members being stapled; and (2) is of sufficient size and made of strong enough material to shield the hand from nails. With this construction, the angular positioning tool also serves as a safety device to avoid accidental hitting of a worker by nails.

The structural member-locating tool is particularly useful in fastening structural members such as studs, rafters and joists across the full length or width of a building. For example, in fastening joists, the use of a tape across the full length of the building avoids the prior art practice of climbing a ladder at several locations to mark the location of the joists along a beam. Instead, the tape or template is stretched across the length and left in place to locate the joists when they are fastened in place. For convenience in laying the tape or template, the tape or template is continuous and may be packaged in spools or boxes used as dispensers and may be mounted to a dolly or cart and dispensed from the dolly or cart. Sections of the continuous tape or template may be cut to size and used rather than requiring a full tape of fixed dimensions which requires that the tape or template be attached with its starting point at a first predetermined location and its end at a second predetermined location a fixed distance from the first predetermined location. The continuous tape or template should be made of a material having an elastic limit greater than 25 psi. Its modulus of elasticity should be more than 100,000 psi.

From the above description, it can be understood that the apparatus and tools of this invention have several advantages, such as: (1) the tape or template is reusable under some circumstances but is inexpensive enough to be disposable and left in place when used; (2) the tape or template is easy to use and clearly marked; (3) the tape or template may be securely fastened by staples so as not to come loose in use; (4) the angular positioning tool provides a convenient method for positioning a structural member at an angle with respect to a second structural member; (5) the structural-member locating tool may be used to position structural members over the entire length or any portion of the length of a building to avoid cumulative errors and high set up time for marking beams; and (6) some embodiments of structural-member locating tools may be conveniently positioned and fastened in place from spools or dolly-mounted dispensers or from boxes.

BRIEF DESCRIPTION OF THE DRAWINGS

The above noted and other features of the invention will be better understood from the following detailed description when considered in conjunction with the following drawings, in which:

FIG. 2 is a fragmentary plan view of one side of the marking tape or template in accordance with an embodiment of the invention;

FIG. 3 is a fragmentary plan view of the opposite side of the tape or template of FIG. 2;

FIG. 12 is a plan view of wall panels that bear on floor rafters and trusses illustrating one manner of using the structural-member locating tool; and FIG. 13 is a flow diagram of a process for using the structural member-locating tool and angular-positioning tool in accordance with an embodiment of the invention.

DETAILED DESCRIPTION OF THE INVENTION

Figure 1:
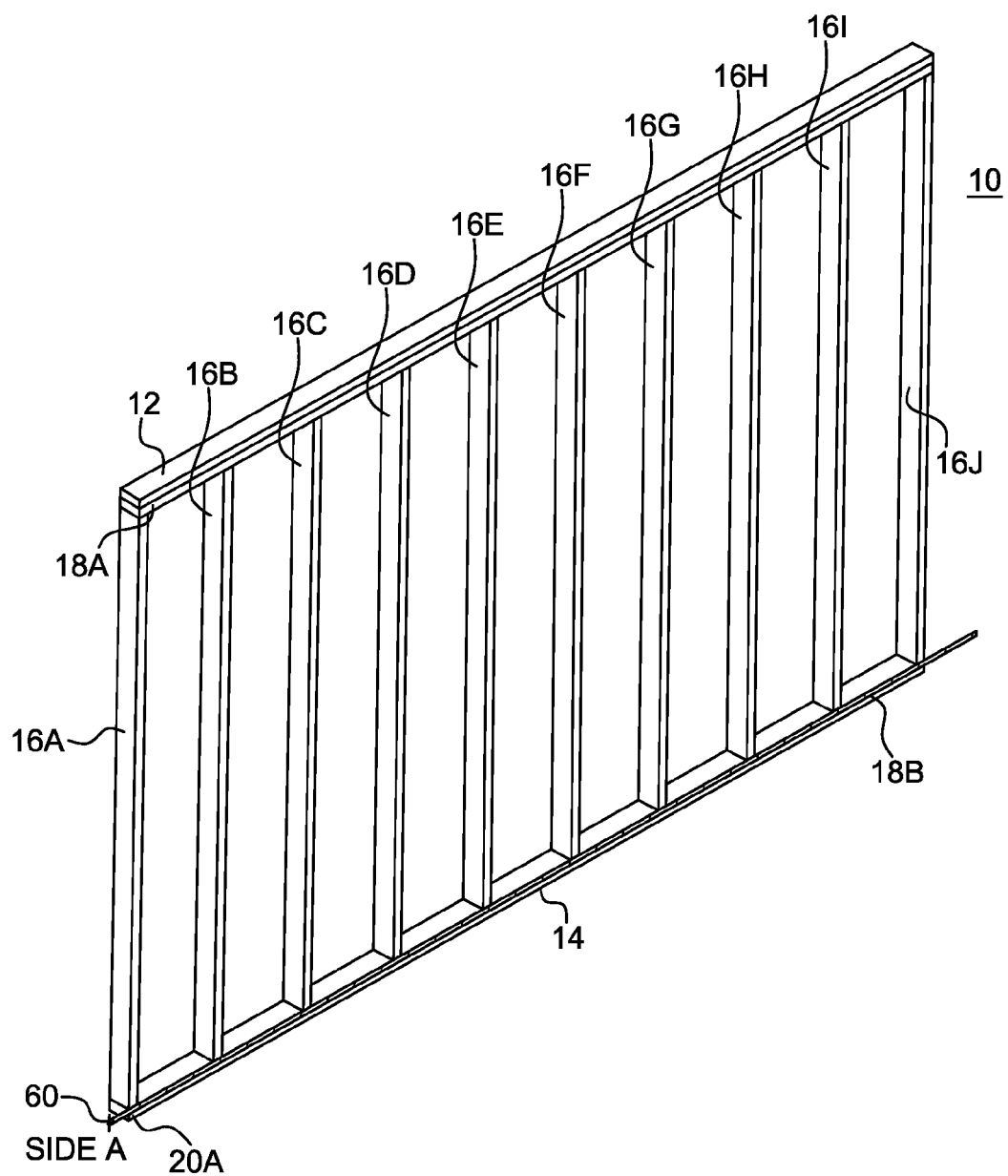
FIG. 1 is a fragmentary perspective view of a section of frame for the side of a building with a construction tool positioned for use in accordance with an embodiment of the invention.

In FIG. 1, there is shown a simplified perspective view of the framework 10 of a section of a building having a top plate 12, a bottom plate 14, and a plurality of structural members such as studs, rafters or joists 16A-16J. A structural member-locating tool 18B is shown positioned on the bottom plate 14 for locating the bottom of the structural members such as studs, rafters or joists 16A-16J on the bottom plate 14. In the preferred embodiment, the structural member-locating tool is a tape or template 18A and 18B. A similar or identical tape or template 18A may be used to position the top of the structural members on the top plate 12 as well.

As shown in FIG. 1, a marking 20A, hereinafter referred to as structural member-locating indicia, indicating the center of the studs for all studs in a panel except a corner stud such as 16A in FIG. 1, is placed at the outer end of the cross member (corner of building) as shown at 60 in FIG. 1. The section 60 in FIG. 1, hereinafter referred to as a structural member-locating tool end portion, is one half the width of the structural member, which is three quarters inch in the case of a stud such as 16A in FIG. 1. However, in the case of other structural members such as joists or rafters, the distance will be different. In such cases the position locating tool may have additional markings so as to accommodate other size structural members and the proper end portion.

In this specification, the words "locating indicia" shall mean spaced apart markings or structural features indicating locations at which structural support members are attached to structural cross members. Similarly, in this specification the words "structural cross member or cross member" shall mean a structural member to which one or more other structural members, hereinafter referred to as structural support members, are to be attached at predetermined locations on the structural cross member or at predetermined distances from each other. For example, a top plate or a bottom plate of a panel in a frame of a house is a structural cross member because studs are attached to it at predetermined distances from each other. The words "structural support member" shall mean a structural member connected to a cross member to make a portion of a frame for a building or similar structure. For example, studs, rafters and joists are considered structural support members in this specification.

In FIG. 2, there is shown a fragmentary plan view of a first side of the tape or template 18 having a plurality of locating indicia or center points 20A-20C indicating on one side of the tape or template the number of inches between locating indicia and on the other side the initials O.C. indicating that it is a center to center measurement. At the corner of a structure, the center point marking is placed at the outer edge of the first stud 16A as shown in FIG. 1 at the reference numeral 20A rather than on center. The remaining structural members such as studs, rafters or joists in that panel are located with their center line being aligned with the center mark of the tape or template. The outer edge of the end stud is located on the center mark to allow space for other construction materials such as insulation or sheeting or the like. The distance is approximately one half the width of the structural support member. For example, in the case of studs, it is three quarters of an inch because studs are one and one-half inches in width. With this arrangement, the first two structural support members are closer to each other by one-half of their width than the other support members. When the insulation and other construction materials are added, the distance from a corner to the second support member is substantially the same as the center to center distances of support members other than the first and second support members.

In FIG. 3, there is shown a plan view of the other side of the tape or template 18 marked for other distances apart. In the embodiment of FIG. 3, it is marked for certain joists and rafters which are either 12 or 24 inches apart on center. To provide such marking or locating indicia without cluttering up the tape or template, each locating indicia is marked on one side with 12 and every other one is also marked with 24 to indicate the 12 inch and 24 inch markings Similarly opposite the marks of 12 or 24 are O.C. for on center.

Figure 4:
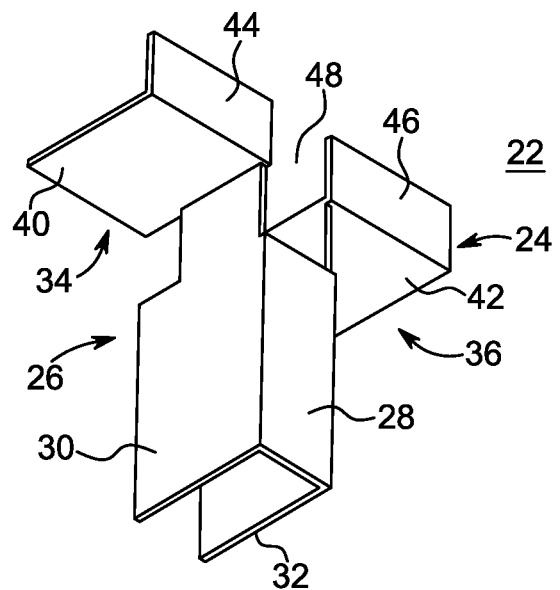
FIG. 4 is a perspective view of an angular-positioning tool in accordance with an embodiment of the invention.
Figure 5:
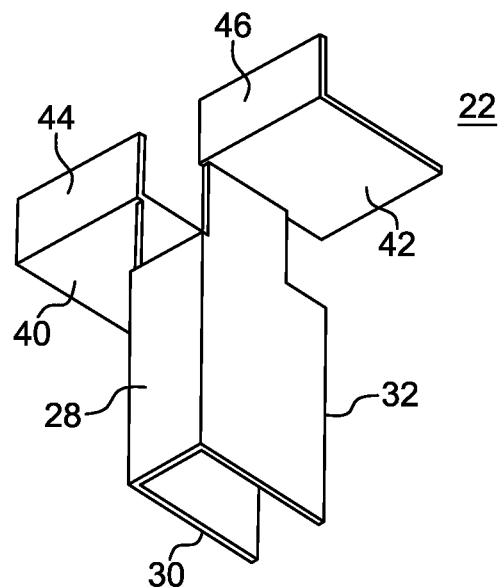
FIG. 5 is another perspective view of the angular-positioning tool of FIG. 4 taken from another angle.

In FIGS. 4 and 5, there are shown two different perspective views of an angular positioning tool 22 generally shaped as a "T" or an inverted "T." In each of these views, one of the orthogonal sections is a stem member 26 and the other is a cross member 24, with the stem member 26 intersecting the cross member 24 near its midpoint. Each of the two orthogonal sections 24 and 26 is "U"-shaped with a base plate and right and left side plates extending from the opposite edges of the base plate and being parallel to each other and perpendicular to the base plate. The side plates are spaced a distance apart to accommodate the structural member such as a stud.

Similarly, the cross member 24 includes right and left positioning members 34 and 36. Each of the positioning members 34 and 36 includes a base plate such as 40 and 42 respectively for receiving one side of the crossing structural member such as a top plate in the case of a stud, and corresponding orthogonal members 44 and 46 positioned orthogonal to the base members 40 and 42 respectively. The orthogonal members 44 and 46 are at right angles to the respective base members 40 and 42 and are mounted with their edges spaced apart the same distance as between side members 30 and 32, which is the width of a stud in the case of positioning structural members such as studs, rafters or joists with respect to upper or lower plates.

While any number of positioning surfaces may be used from two positioning surfaces with a first surface extending in one direction to provide a first positioning surface and a second surface extending in a direction and at an angle to the first surface to any larger number of surfaces, two sets of positioning surfaces are provided at right angles to each other in the preferred embodiment. One set includes three surfaces forming a "U" that holds a first structural member and a second set of three positioning surfaces that holds a second structural member at the selected angle to the first structural member. Additionally, one or more handles or openings for convenience in gripping the angular positioning tool may be provided.

While a specific configuration of orthogonal surfaces are shown in the embodiments of FIGS. 4-5 for positioning structural members orthogonal to each other, there are many alternative configurations which could be used. Generally, the configurations must at least have one flat surface which is either permanently affixed or which can be affixed in use at a predetermined angle to another positioning surface. Preferably, at least one of those surfaces will have a second positioning surface orthogonal to it to position two sides of at least one of the structural members.

The angular-positioning tool 22 includes a window or opening 48 (shown in FIG. 4) exposing one side of the cross-member such as the top plate to enable convenient viewing of the center mark of the tape or template. The window 48 also provides a convenient space for fastening such as by toe nailing with a staple or hammering a nail to the cross-structural members.

Figure 6:
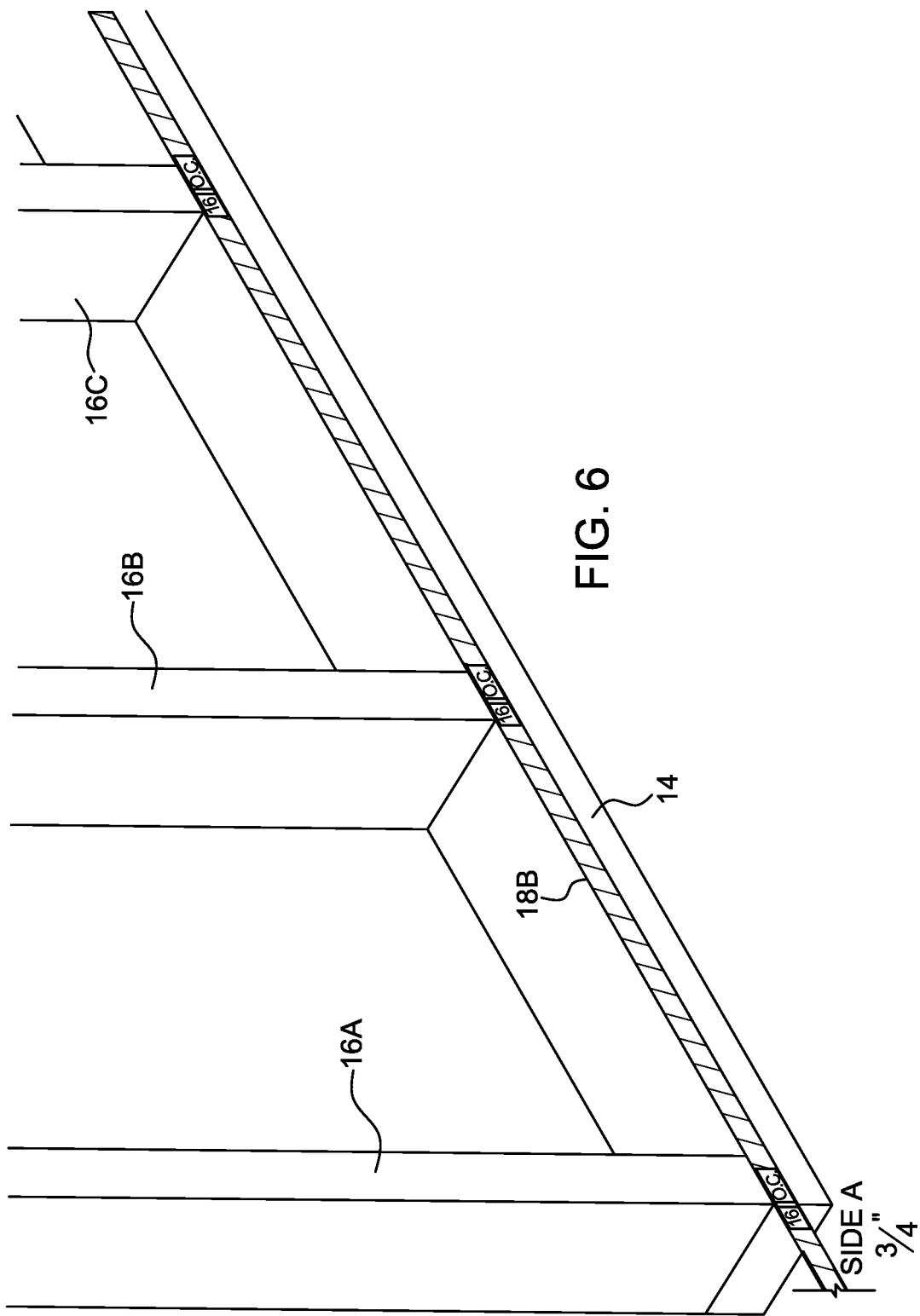
FIG. 6 is a fragmentary enlarged perspective view of a marking tape or template positioned to measure the location of structural members such as studs, rafters or joists against a bottom plate of a section of building frame.

In FIG. 6, there is shown a fragmentary perspective view of a frame work section having a bottom plate 14, and three structural members such as studs, rafters or joists 16A-16C showing a manner in which the tape or template 18B is used to position the bottom of the structural members such as studs, rafters or joists 16A-16C at 16 inch centers with the end stud 16A being 15¼ inches from the center mark of the stud 16B as described above.

Figure 7:
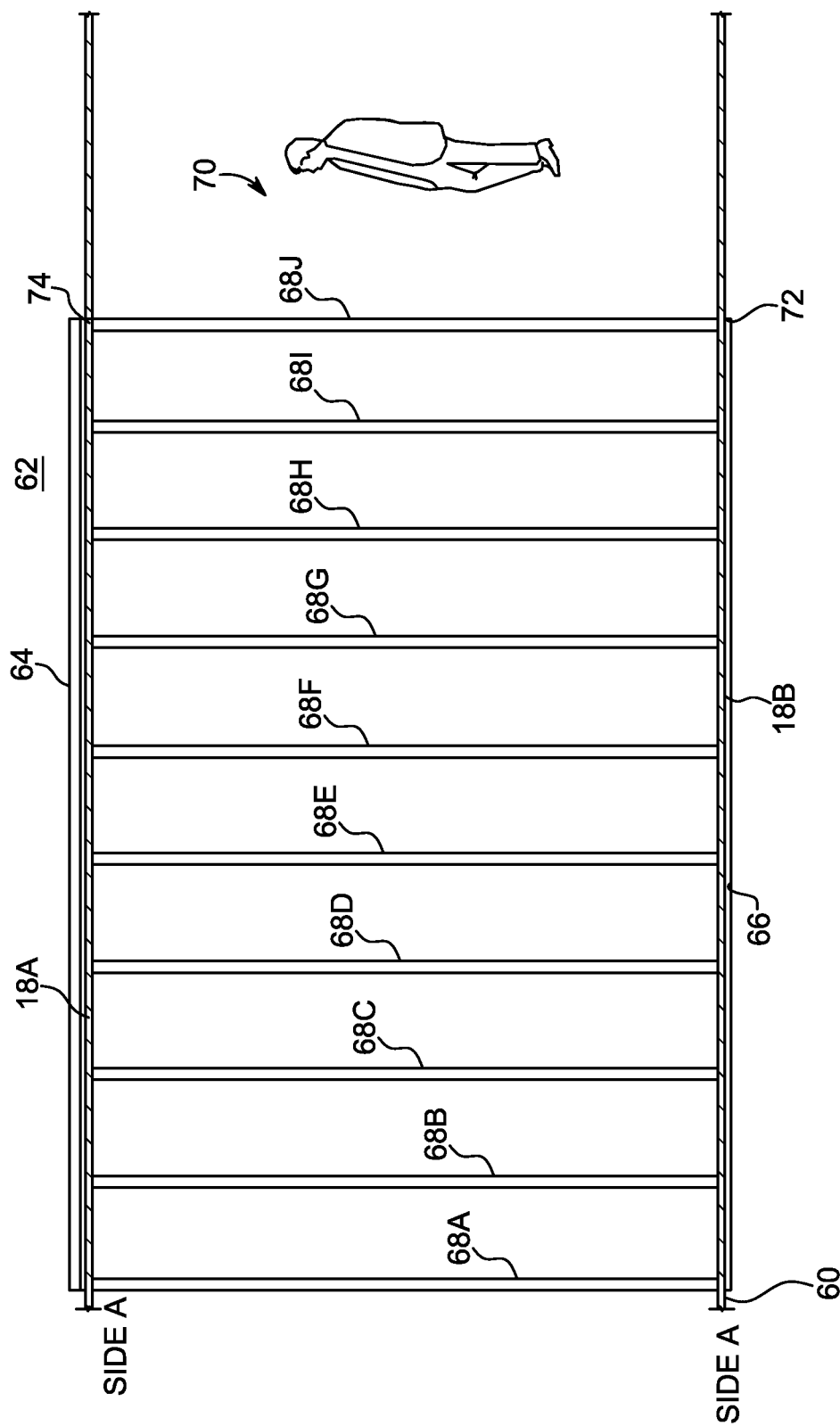
FIG. 7 is a simplified, fragmentary perspective view of the manner in which the construction tools of this invention may be used by a construction worker.

In FIG. 7, there is shown a simplified fragmentary elevational view of a panel 62 having a top plate 64, a bottom plate 66, and a plurality of studs 68A-68J forming the panel. In preparing the panel, the structural member-locating-tools 18A and 18B are laid across the top plate 64 and the bottom plate 66 repeatedly. The locating indicia is aligned with the end of the cross member such as 64 with a portion of the structural member-locating tool extending beyond it. In the case of a stud, this end portion is three-quarters of an inch to allow for siding or other material. The structural member locating tools 18A and 18B are stretched over the cross members and the studs nailed by a workman such as shown at 70 in place at the top and bottom to form a panel. If the panel is prepared off site, staples may be removed at one end such as the end 72 and moved to a diagonal position such as 74 on the top plate 64. Similarly, the top tape 18A may be unstapled at 74 and moved to the corner 72 to have diagonal tapes holding the panel in shape for stacking and then removing. This has an advantage over the prior art method of nailing 2×4 braces because it is difficult to stack the panels for convenient moving with 2×4 braces in place. Un-stapling and moving the tapes is quick and efficient and because the tapes are thinner, the panels may be stacked after that and moved to the site for use in the building.

Figure 8:
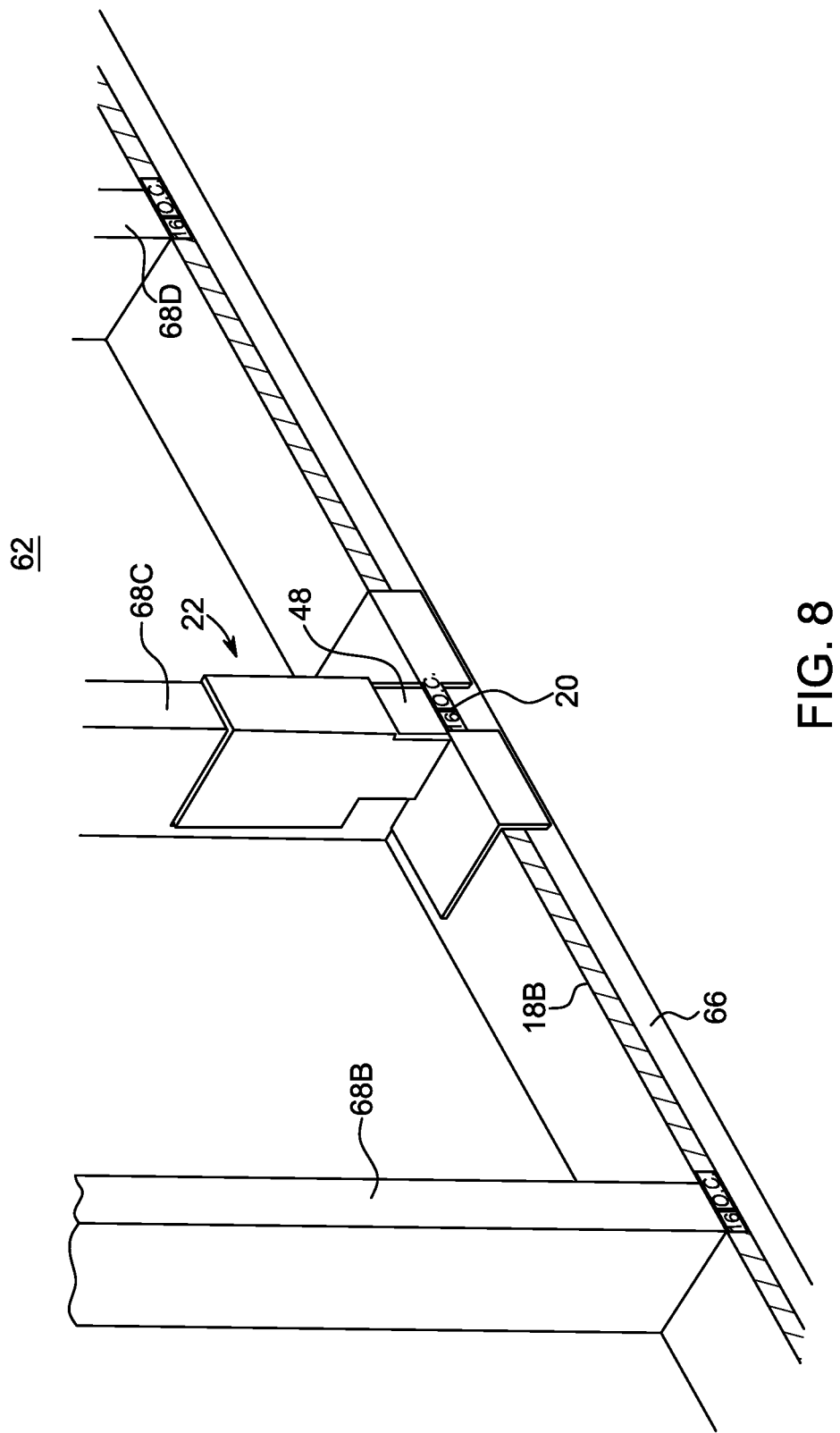
FIG. 8 is a simplified, perspective, fragmentary view of a portion of a panel, with the lower portion of three studs, a structural member-locating tool and an angular positioning tool in position to aid in the locating and positioning of one of the studs.

In FIG. 8, there is shown a simplified, perspective, fragmentary view of a portion of the panel 62 having the bottom plate 66 with the lower portion of three studs 68B, 68C and 68D. As shown in this view, the angular-positioning tool 22 positioned to grip the stud 68C and the bottom plate 66 and overlying the structural member-locating tool 18B, with the window 48 being positioned to show a center marking 20. With this arrangement, the angular positioning tool 22 may be located in such a manner to hold the stud 68C conveniently over a center point. The window 48 is large enough to permit nailing of the stud in place at that location for accurate angular locating and longitudinal locating of the studs.

Figure 9:
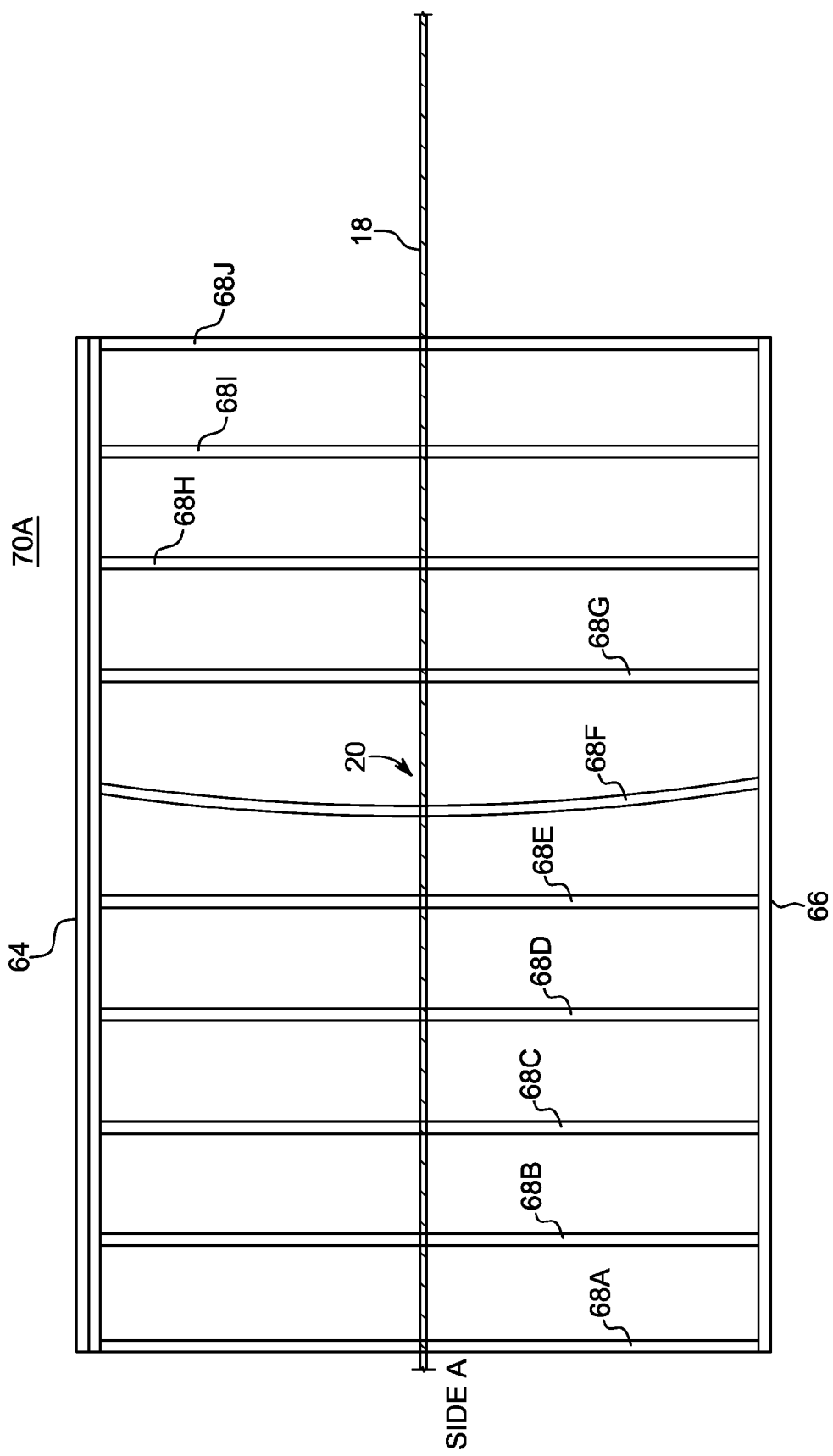
FIG. 9 is a simplified elevational view of a panel illustrating a first stage in another manner of using the structural member-locating tool in accordance with an embodiment of the invention.

In FIG. 9, there is shown a simplified side view of a plurality of structural members such as studs, rafters or joists 68A-68J, one of which is warped shown at 68F. The tape or template 18 may be connected across these structural members such as studs, rafters or joists starting with an end stud and the warped stud may be positioned on center by forcing it into position using the tape or template. As shown in this view, the stud 68F is warped so that where it crosses the structural member-locating tool 18 at the center of the panel, it will be spaced a distance from the center mark shown at 20. Because of the existence of the center mark, the stud may be pulled over so that its center line is under the locating indicia and fastened in place to any cross member or any member fixed in place such as siding or plaster board or even a separate cross brace.

The warped stud may be positioned for example by a drywaller and when properly positioned to remove the warp fastened such as by gluing to the drywall. While a specific example of a warped stud has been given, there are many other such inconsistencies and other structural members which may be improperly positioned in the initial framing or other initial work. The use of the tape or template enables many of these to be properly positioned and fastened in place in the correct position. Similarly, the tape or template 18 may be positioned such as on the floor for the benefit of drywallers or finishers so they may locate the center line of structural members such as studs, rafters or joists for their use.

Figure 10:
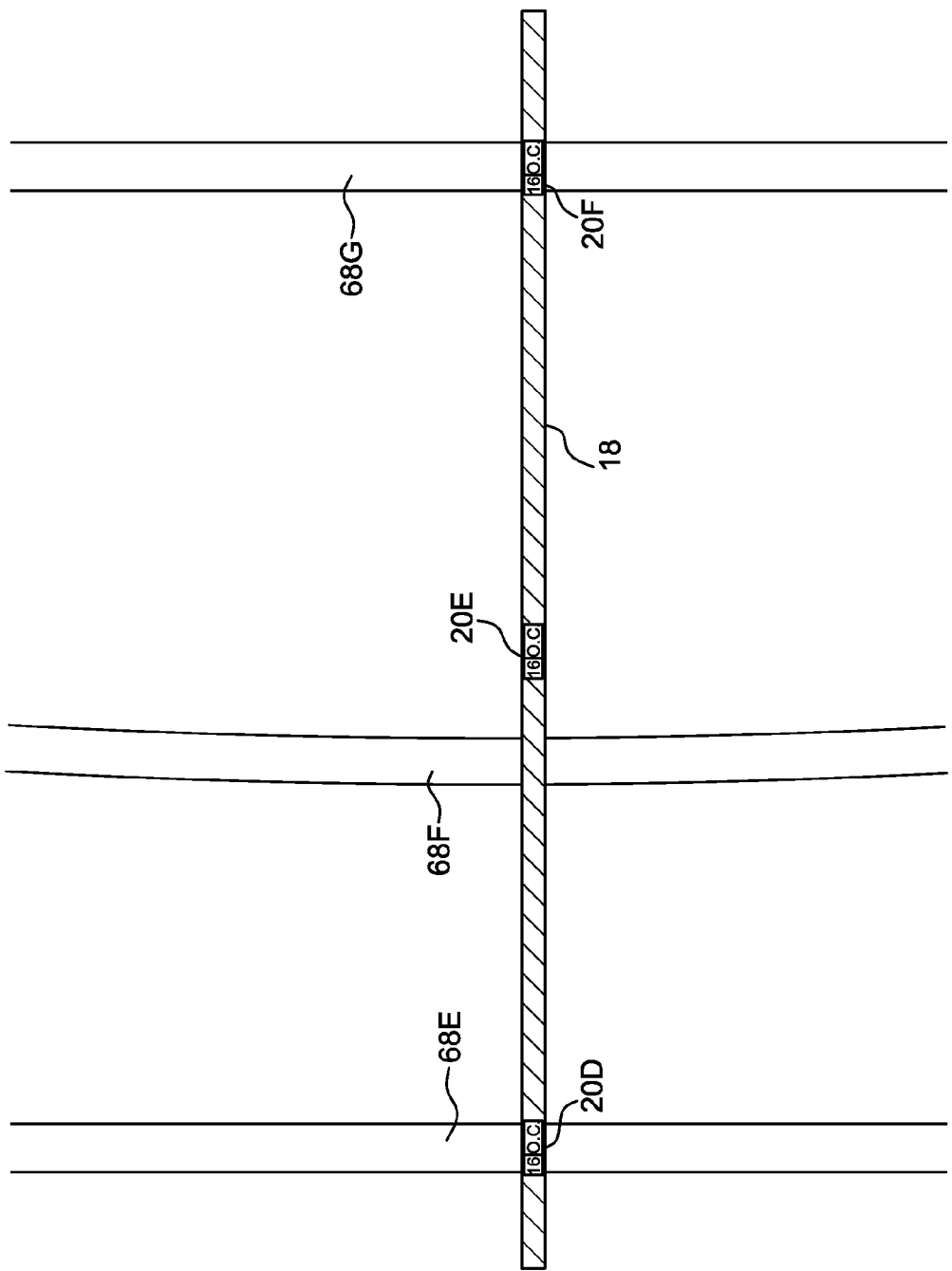
FIG. 10 is a simplified elevational view of a panel illustrating a second stage in the manner of using the structural member-locating tool in accordance with an embodiment of FIG. 10.

In FIG. 10, there is shown an enlarged elevational view illustrating the use of the structural member-locating tool 18 as shown in less detail in FIG. 9. In FIG. 10, the stud 68F is shown between the studs 68E and 68G as shown in less detail in FIG. 9 except the stud 68F has been moved closer to the indicating indicia 20E. In the use of the structural member-locating tool 18 illustrated by FIGS. 9 and 10, the stud will be forced completely into position by moving it to the right until the center line of the stud 68E is lined up with the locating indicia 20E and then fastened in place such as by a cross brace or by nailing it to drywall or sheeting or any other structural member that will be located in the same place to hold the stud in place. In this manner, other construction workers such as someone installing siding will have less difficulty in locating the stud to which the other material such as siding or drywall or the like is to be fastened.

The structural member-locating tool 18 may also be utilized for positioning other structural members after the framing has been done. For example, when siding is being applied, the location of the structural members such as studs, rafters or joists for fastening the siding, can be quickly and easily located by stretching the tape or template outside of the siding in a position aligned with the positioning of the tape or template when the structural members such as studs, rafters or joists were fastened. This will give the center on center positions for fastening the siding or other structural members in place.

Figure 11:
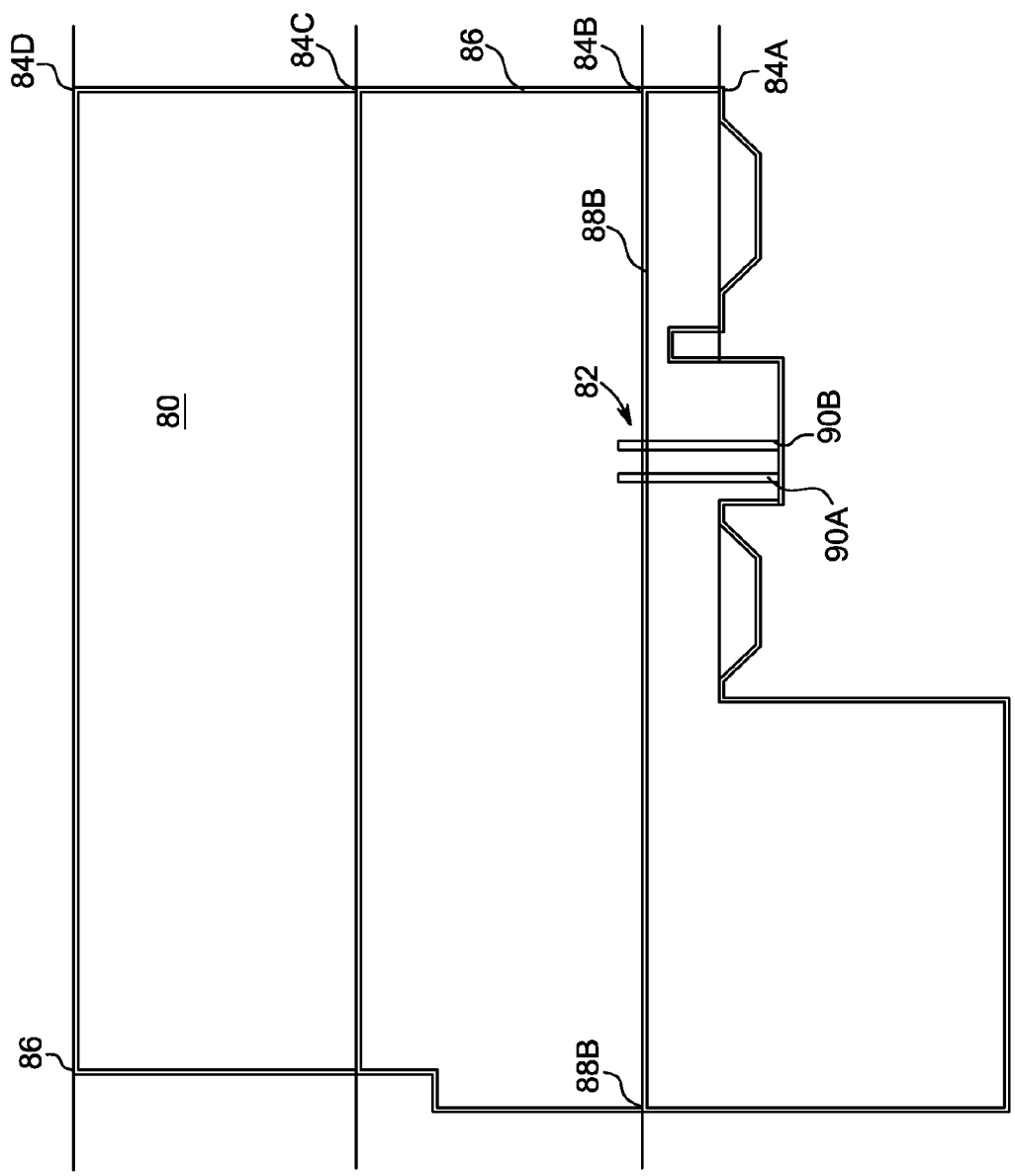
FIG. 11 is a plan view of a residential foundation illustrating the different methods in which the structural member-locating tool may be utilized in a timesaving manner to position floor joists.

In FIG. 11, there is shown a plan view of a residential foundation 80 illustrating the different methods in which the structural member-locating tool 18 may be utilized in a time-saving manner to position floor joists such as the floor joist 82. In such an arrangement, one end of the structural member-locating tool 18 may be fastened at a convenient location at the end of the building and extended a full length to the opposite side of the building. In this specification, the words "full locating length" shall mean the total length over which structural support members are positioned under circumstances in which their positions are related such as by code regulations specifying the distance apart of the structural members. Thus the full positioning length may be the distance from one end of a building to the other end including any corners or the like included in the frame so that it may be longer than the width or length of the building. For example as shown in FIG. 11, one cross member 86 has a plurality of orthogonal cross members such as shown 84A-84D to which floor joists may be fastened. The structural member-locating tool 18 may be fastened at any of the points 84A-84D and extend across the orthogonal cross member such as illustrated at 88B to the opposite end of the building as indicated at 88B in FIG. 11. This arrangement may conveniently mark spaced apart locations for fastening the joists as shown at 82.

Similarly, other sections of the structural member-locating tool 18 may be fastened at the ends 84A, 84C and 84D and stretched straight across to the opposite end of the building. Each of these structural member-locating tools 18 has locating indicia aligned with the locating indicia on the member 88B to provide aligned locations for fastening the floor joists. This is particularly convenient when the foundation such as that shown in FIG. 11 consists of multiple corners extending in one direction to the other in providing accurate fastening locations such as shown at 90A and 90B since the tools may be moved from any location at the side of a building to the opposite side or to any other intermediate point that is convenient for the construction workers. With this arrangement, the structural member-locating tool 18 is continuously stretched from one end to another or to any intermediate point between the ends with no interruption. This use of the structural member locating tools 18 is particularly time saving in case of a foundation since the construction worker may fasten it at one end of the building and move to the second end and fasten it without moving up and down ladders every few feet.

In FIG. 12, there is shown a plan view of a building floor with floor rafters and trusses such as shown at 92A-92C. In this application, the structural member-locating tool 18 is fastened at a point such as 94 and stretched across a structural member extending to the opposite side of the building such as shown at 96 or to some convenient intermediate member when desired. Thus, locating points may be found with the tape at any time. Similarly, a structural member-locating tool 18 may be fastened at other points such as the point 98 and stretched across a structural member to a corresponding point 100 to give another locating point for the fastening of the rafter or trusses, such as 92A-92C.

In FIG. 13, there is shown a flow diagram of a process 102 for using the structural member-locating tool 18 including the step 104 of positioning the structural member locating tool with a locating indicia at the end of a structural cross member, the step 106 of stretching the structural member locating tool a full length along the two structural cross members to which the two ends of the structural support member are to be attached, the step 108 of placing an angular positioning tool on the first structural support member and on the cross members to hold the structural support member and cross member at the desired angle with respect to each other, the step 110 of fastening the first structural support member to the cross member with the outer side of the structural support member even with the side of the corner and end of tape or template extending past the side, the step 112 of placing the angular positioning tool on a second structural support member and on a cross member to hold the structural support member and cross member at the desired angle with respect to each other and with the center line of the second support member in alignment with the locating indicia, the step 114 fastening the support member to the cross member at both ends and the step 116 of repeat the locating and angular positioning and fastening steps until complete using the structural-support member for the full length.

From the above description, it can be understood that, the apparatus and tools of this invention have several advantages, such as: (1) the tape or template is reusable under some circumstances but is inexpensive enough to be disposable and left in place when used; (2) the tape or template is easy to use and clearly marked; (3) the tape or template may be securely fastened by staples so as not to come loose in use; (4) the angular positioning-tool provides a convenient method for positioning a structural member at an angle with respect to a second structural member; (5) the structural member-locating tool may be used to position structural members over the entire length or any portion of the length of a building to avoid cumulative errors and high set up time for marking beams; and (6) some embodiments of structural member-locating tools may be conveniently positioned and fastened in place from spools or dolly-mounted dispensers or from boxes.

Although a preferred embodiment of the invention has been described in particular detail, there are many modifications and variations in the invention that are not explicitly stated but known to be possible. Accordingly, within the scope of the appended claims, it is to be understood that the invention may be practiced other than as specifically described.

What is claimed is:

1. A combination of construction tools comprising:

an angular-positioning tool for positioning a structural support member with respect to a structural cross member and a locating tool for locating the structural support member;

the angular-positioning tool having at least a first surface and a second surface constructed to form at least one angle with respect to each other;

said first surface being constructed to position the structural support member and said second surface constructed to position the structural cross member; wherein the structural support member is positioned at a predetermined angle with respect to said structural cross member;

said locating tool including spaced-apart indicia indicating the distance apart of locations at which structural support members are to be located on structural cross members;

said angular-positioning tool having an opening located to permit a construction worker to see said indicia at one of said locations when the angular-positioning tool is holding the structural support member at a predetermined angle with respect to the structural cross member at said one location on said structural cross member.

* * * * *